United States Patent [19]

Borrello

[11] 4,067,173
[45] Jan. 10, 1978

[54] PACKAGING MACHINE

[75] Inventor: Denis Borrello, Poughkeepsie, N.Y.

[73] Assignee: Foodways National, Inc., Hawthorne, N.Y.

[21] Appl. No.: 674,559

[22] Filed: Apr. 7, 1976

Related U.S. Application Data

[63] Continuation-in-part of Ser. No. 558,132, March 13, 1975, Pat. No. 4,004,399.

[51] Int. Cl.² .......................... B65B 9/12; B65B 51/30
[52] U.S. Cl. .................................. 53/180 M; 53/202; 83/139; 83/328
[58] Field of Search ........... 53/180 M, 180 R, 182 M, 53/202, 112 A; 83/117, 139, 328; 222/274, 288, 295, 367, 368

[56] References Cited

U.S. PATENT DOCUMENTS

| | | | |
|---|---|---|---|
| 1,721,635 | 7/1929 | Miles | 222/295 X |
| 2,145,941 | 2/1939 | Maxfield | 53/112 A X |
| 2,827,742 | 3/1958 | Bursak | 53/180 M X |
| 3,131,821 | 5/1964 | Tsujihata et al. | 222/368 X |
| 3,288,013 | 11/1966 | Cochrane | 83/328 |
| 3,559,517 | 2/1971 | Smith et al. | 83/117 |
| 3,567,463 | 3/1971 | Williams | 206/484 X |
| 3,641,737 | 2/1972 | Tamagni | 53/182 M |
| 4,004,399 | 1/1977 | Borrello | 53/180 M |

Primary Examiner—Travis S. McGehee
Attorney, Agent, or Firm—Kenyon & Kenyon

[57] ABSTRACT

The packaging machine is provided with a dumper shaft which includes material receiving chambers which can be adjusted in size to receive and measure varying amounts of material. Each material receiving means is made up of a pair of coaxial discs and radiating plates between the discs, the discs being held in place by locking collars. Outlet nozzles from the hopper above the dumper shaft are disposed to empty into a respective chamber while being disposed within the plane of the chamber. As the dumper shaft is rotated, the hopper and the outlets are raised to permit rotation. The upper edge of each plate has a lip or ledge directed in the direction of rotation of the dumper shaft to retain the material during rotation.

Different types of materials may also be dispensed by the use of a dual system of dumper shafts. Also, doublepocket packets can be formed by use of modified seal bars.

9 Claims, 16 Drawing Figures

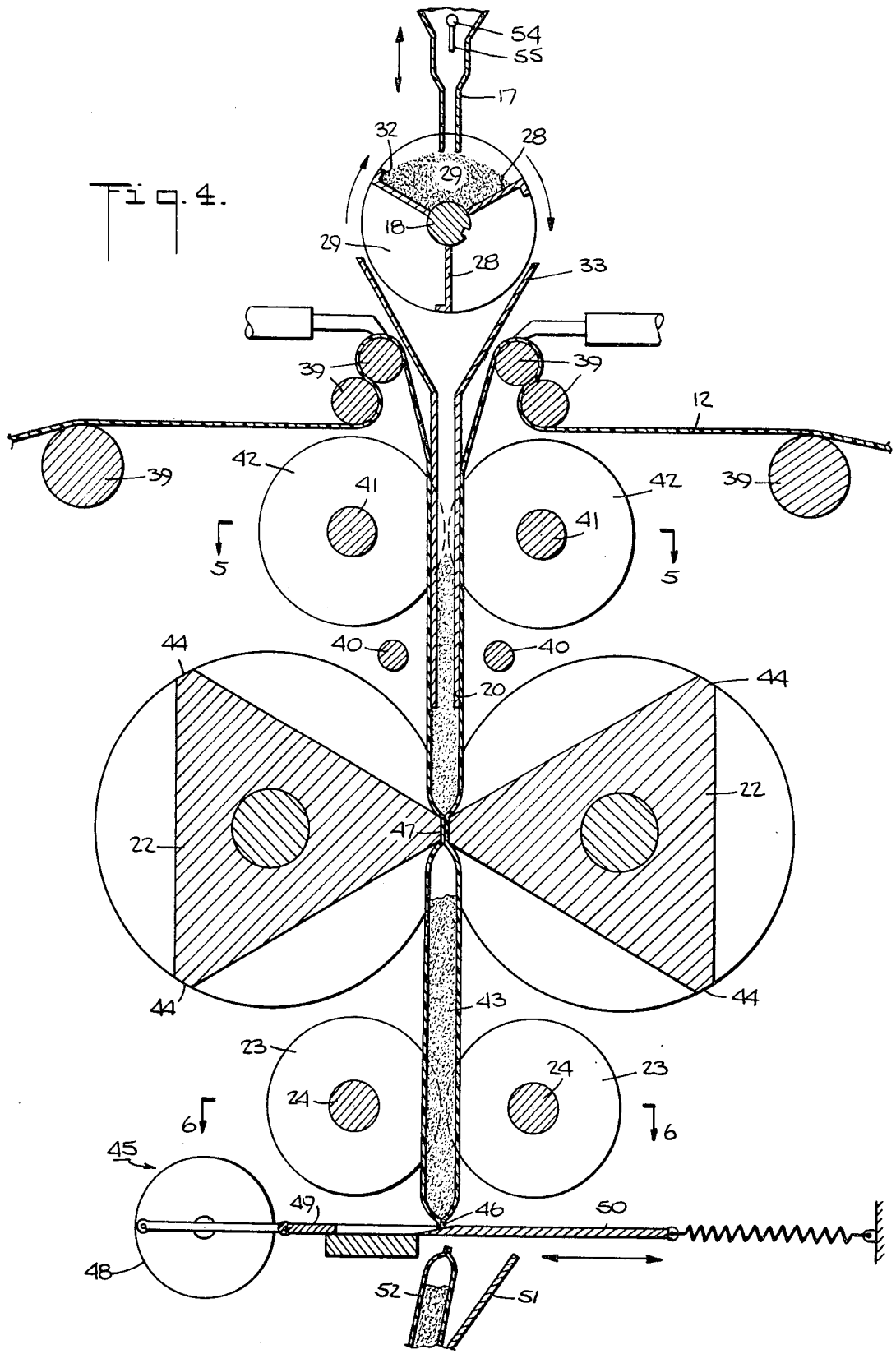

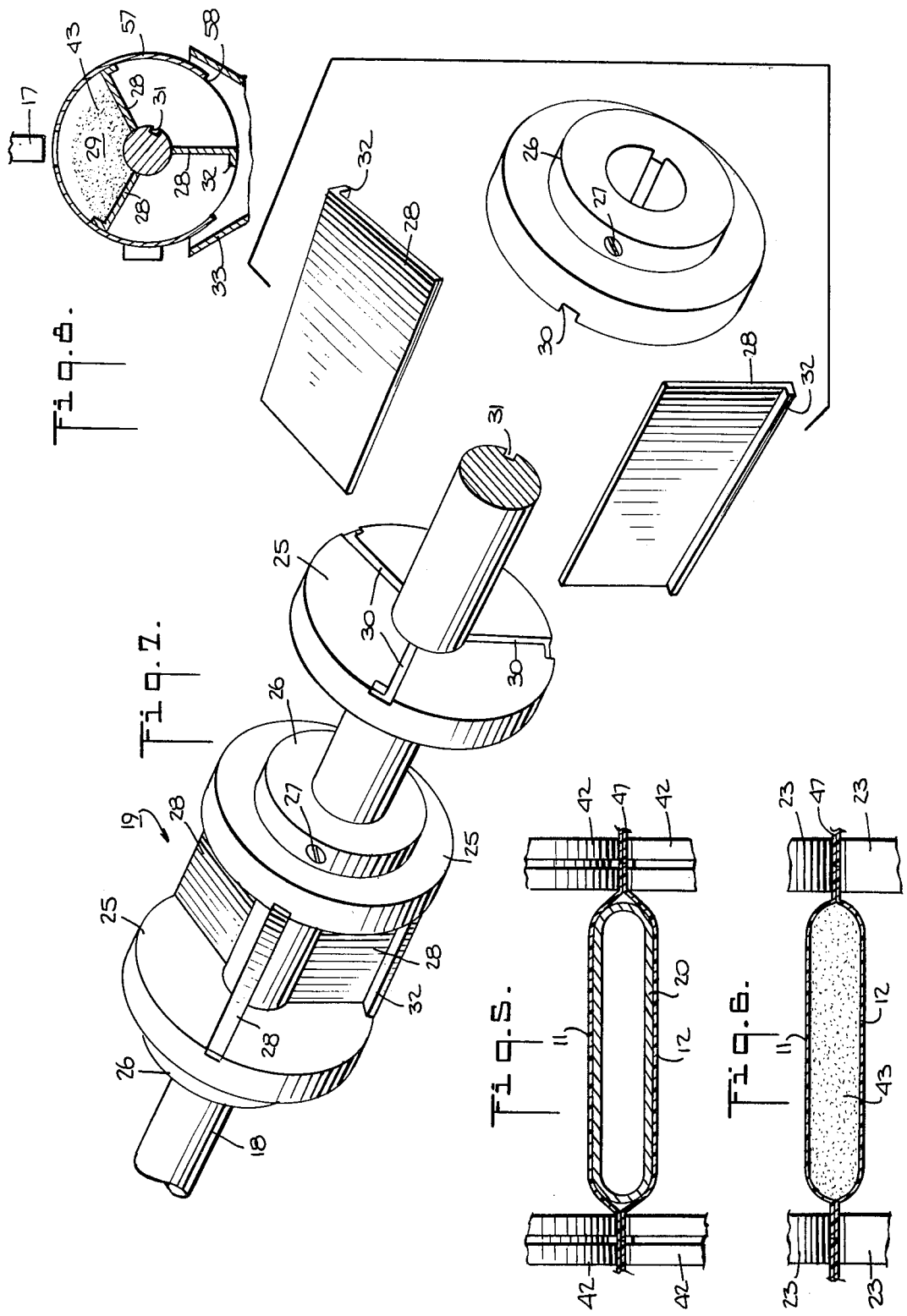

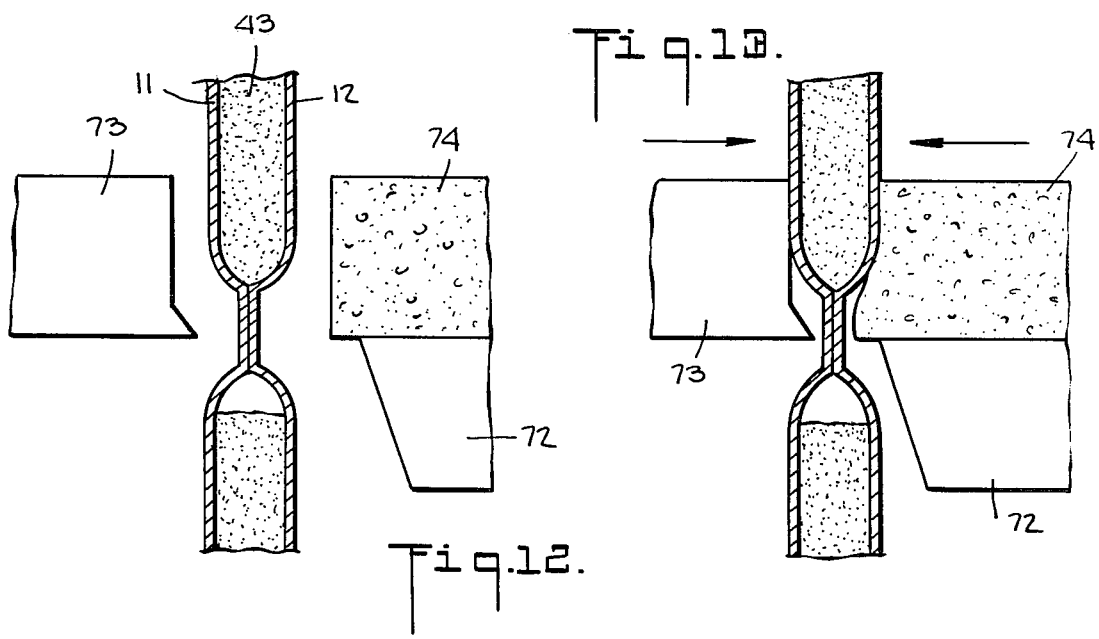
Fig. 12.
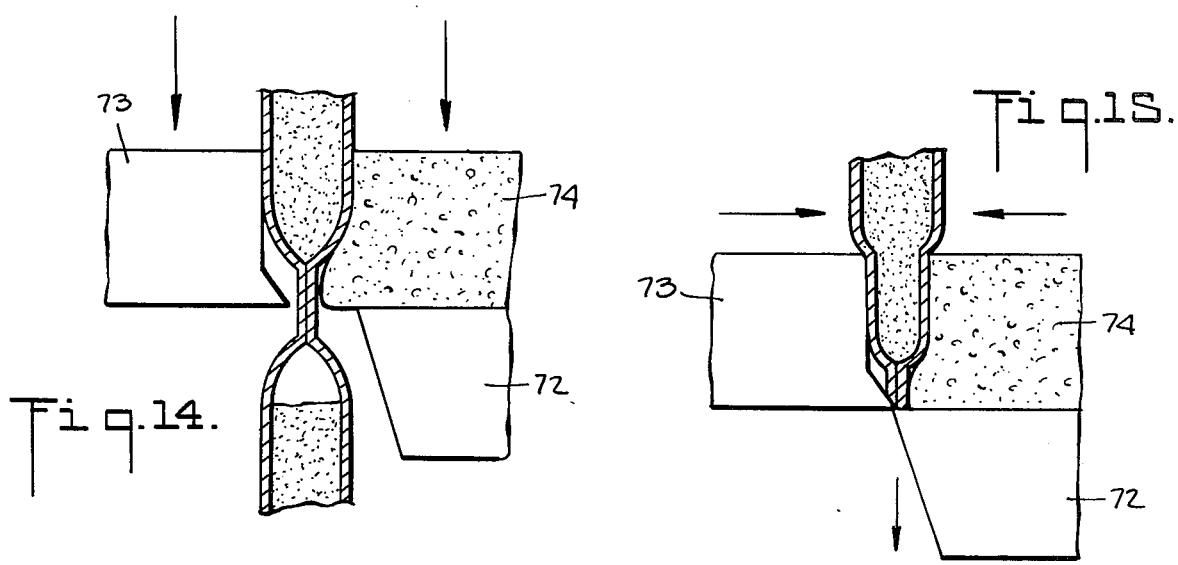
Fig. 13.
Fig. 14.
Fig. 15.
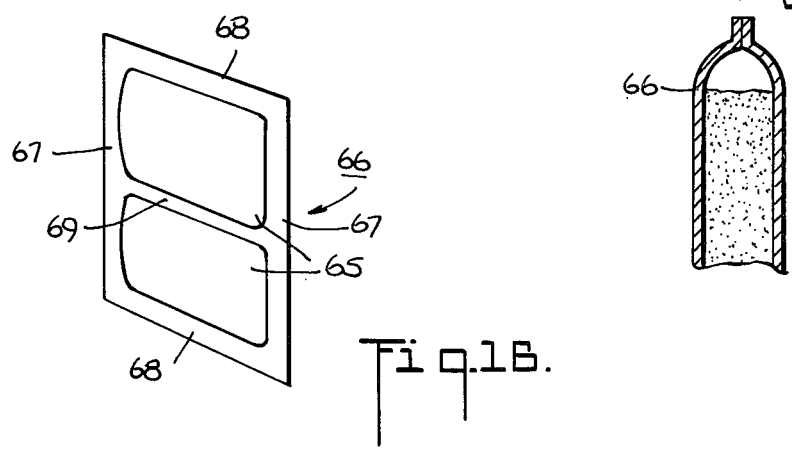
Fig. 16.

PACKAGING MACHINE

This application is a continuation-in-part of U.S. patent application Ser. No. 558,132, filed Mar. 13, 1975 now U.S. Pat. No. 4,004,399.

This invention relates to a packaging machine. More particularly, this invention relates to a packaging machine for packaging packets of measured amounts of material.

Heretofore, various machines have been known for packaging materials in packet form. Generally, these machines have been of the type where two continuous sheets of paper, foil or the like have been moved into facing relation with various sealing means effecting transverse and vertical lines of sealing between the two sheets. The sealing means are usually arranged to effect two vertical seals along the sides of the packet to be produced and a bottom seal along the bottom edge of the packet to be produced. Prior to sealing across the top edge of the packet, measured amounts of material are deposited into the partially formed packets. Thereafter, the top seal is effected and a severing operation carried out to form individual packets.

In general, the prior machines have been limited in the size of the packets which could be produced. For example, the machines have been limited to producing packets of a length of up to about 2½ inches and a width generally in the range of 1½ to 2½ inches with a maximum width of 6 to 10 inches. In addition, the weight of the contents of such packages have generally been limited to a maximum amount of about 2 grams.

In addition, these machines have generally been limited to the production of packets containing a fixed amount of material. Accordingly, in order to be able to produce packets of substantially different sizes and weight contents, it has generally been necessary to use more than one machine with each built to produce a certain size packet of a certain content with little range for adjusting the size and weight parameter. This, however, requires substantial expense on the part of the packer. In addition, in the event that certain packet sizes are not to be produced, there may be considerable down time for those machines which produce such packets. In some cases, in order to avoid the need to have more than one machine for a range of packet sizes and weights, machines have been known in which a filler head of one size can be removed and replaced by a filler head of another size. This, however, has usually required a substantial tear-down of the machine when changing the filling heads. This, in turn, reduces the overall efficiency of operation.

In addition, in some instances, the packets which have been produced have not been totally sealed due to the presence of particles of the packaged material or impurities within the sealed areas of the packets. As a result, the shelf-life of these packets can become reduced.

In other instances, the sealing together of two continuous sheets of paper has not been accurate due to puckering of the sheets within the sealing means.

Accordingly, it is an object of the invention to provide a dumper shaft for a packaging machine which is capable of measuring and dispensing variable weights of material.

It is another object of the invention to provide a packaging machine which is able to produce packets of substantial sizes.

It is another object of the invention to produce a packaging machine which can be readily adapted to produce packets of substantially different sizes.

It is another object of the invention to provide a packaging machine which can reduce the down time of a packaging plant.

It is another object of the invention to provide a packaging machine for making multi-ingredient containing packets.

It is another object of the invention to provide a packaging machine for making multi-ingredient containing packets.

It is another object of the invention to provide a double-pocket packet of material.

It is another object of the invention to effect efficient leak-proof seams in continuously produced packets of material.

Briefly, the invention provides a packaging machine for dispensing packets of measured amounts of material and which utilizes a dumper shaft for measuring out varying amounts of material. The packaging machine is constructed with a hopper, a rotatable dumper shaft for measuring out material, guide tubes below the dumper shaft, means for moving a pair of continuous sheets over the guide tubes, means for sealing the continuous sheets to each other between and alongside the guide tubes and a pair of rotatable seal bars for sealing the sheets to each other transversely of the guide tubes to define sequentially spaced packets containing the measured amounts of material.

The hopper is arranged to receive a supply of flowable material from a suitable source and includes a plurality of outlet nozzles in the base for an outflow of a plurality of streams of the material. The dumper shaft which is below the hopper has a plurality of flow measuring means for receiving the respective streams of flowable material from the outlet nozzles. Each of these measuring means is disposed below a nozzle and includes a plurality of material receiving chambers disposed circumferentially about the shaft. Each of these chambers is adjustable in size to receive varying amounts of material from a nozzle. To this end, each measuring means is defined by a pair of discs which are adjustably mounted on the dumper shaft in spaced coaxial relation and a plurality of plates disposed between the discs radially of the dumper shaft. Due to the adjustable nature of the discs, plates of greater or smaller width can be disposed between the discs to form chambers of different sizes for accommodating a wide range of material weights.

The outlet nozzles are positioned to dispense material into the respective chambers of the dumper shaft and for this purpose project into the plane of a chamber when dispensing. By adjusting the height of the nozzles in the chambers, a greater or lesser amount of material is dispensed. In addition, a means is provided in the packaging machine for moving the hopper vertically relative to the dumper shaft during rotation of the dumper shaft with the movement of the hopper being synchronized to the rotation of the dumper shaft by a suitable means. In this respect, the outlet nozzles of the hopper are disposed to move between a position in the circumferential plane of the plates of the measuring means and a position spaced therefrom.

In order to ensure containment of the material in a chamber of the dumper shaft during rotation, each plate of a material receiving chamber has a lip at a radially outer end which is directed in the direction of rotation of the dumper shaft. This has been found to effectively prevent the material from spilling out in a direction opposite the direction of rotation during rotation of the dumper shaft.

In order to accurately measure out a quantity of material into each material receiving chamber of the dumper shaft, the discs and plates are first placed on the dumper shaft in respective spatial relation to each other to define chambers of a certain size adapted to receive a volume of material. In addition, the depth of penetration of the outlet nozzles of the hopper are set to a predetermined amount to effect a fine adjustment in the amount of material to be dispensed. Thus, as the material flows out of the nozzles, the material fills each chamber up to the level of the outlet nozzles. Continued filling will then cease. In this way, by regulating the shape and dimensions of each chamber and the height of the outlet nozzle in each chamber, a predetermined volume of material can be dispensed in each chamber. Upon rotation of the dumper shaft, the measured amount of material is dispensed into a guide tube. The amount of material which flows out of the outlet nozzle during rotation of the dumper shaft chamber is substantially insignificant. However, where appropriate, this amount of material may be taken into account in establishing the size of each chamber.

The guide tubes which receive the material dispensed from the dumper shaft are each aligned with a respective measuring means to guide the measured amount of material therethrough. In addition, the guide tubes serve as forming tubes for the two sheets provided to form the packets. To this end, the guide tubes terminate at a lower end which is spaced slightly above the seal bars for effecting the transverse seals while being spaced between the side sealing means.

The dumper shaft of the invention may be constructed in any suitable fashion to form material receiving chambers which can be adjusted in size to receive different amounts of material. In this respect, it is noted that the amount of material dispensed into a chamber can be varied slightly by raising or lowering the outlet nozzles of the hopper. When dispensing relatively small amounts of material, the nozzles may be relied upon to effect a fine adjustment. In the case of relatively large amounts of dispensed materials, the fine adjustment may not be necessary.

The packaging machine which can produce packets of any size width within a 15 inch range, that is 15 inches by 2½ inches; 7½ inches by 2½ inches and any size length within a 4 inch range.

Since most packaging materials are sealed using heat as the agent, the packaging machine is adapted with a suitable sealing means to effect a seal of any stock from 1° F to 400° F.

The speed of the machine is in direct relation to the size of the packet. That is, if the pouch is 15 inches long and 2½ inches wide, the range of speed would be approximately 85 per minute. The amount of material measured out by the packaging machine can be in any suitable range, from 1 gram up to 1 pound.

In another embodiment, the packaging machine is provided with a dual system of hoppers and dumper shafts so as to be capable of dispensing different types of materials into the packets.

In order to prevent the accumulation of dust within the area of the seal bars, a pair of conduits are arranged adjacent each guide tube with each conduit extending to the lower end of the guide tube. In addition, a suction means is connected to the conduits to evacuate the region surrounding the lower end of the guide tube. Alternatively, these conduits may be connected to a means for supplying a flowable material for packaging within the packets. For example, the tubes may be used to inject steam, nitrogen or liquids into the packets for various purposes such as sterilization.

In order to effect a reliable severing operation as well as a reliable sealing operation, the cutting means can be in the form of an orbital cutting means. To this end, the cutting means includes an orbitally movable cutting blade and an orbitally movable shear plate for engaging and severing the sheets while pulling the sheets to slightly stretch the sheets. This stretching allows a clean cut to be made through the sheets and also allows the seal bars to effect a reliable seal without puckering of the sheets due to a back-up caused by the severing operation.

These and other objects and advantages of the invention will become more apparent from the following detailed description and appended claims taken in conjunction with the accompanying drawings in which:

FIG. 4 illustrates a side sectional view of a portion of the packaging machine according to the invention;

FIG. 5 illustrates a view taken on line 5—5 of FIG. 4;

FIG. 6 illustrates a view taken on line 6—6 of FIG. 4;

FIG. 7 illustrates a partially exploded view of a dumper shaft according to the invention;

FIG. 8 illustrates a cross-sectional view of a material receiving means on the dumper shaft according to the invention;

FIGS. 12 to 15 illustrates schematic views of the cutting means of FIG. 9 at different stages of operation; and FIG. 16 illustrates a view of a double-pocket packet made by the machine of FIG. 9.

Figure 1:
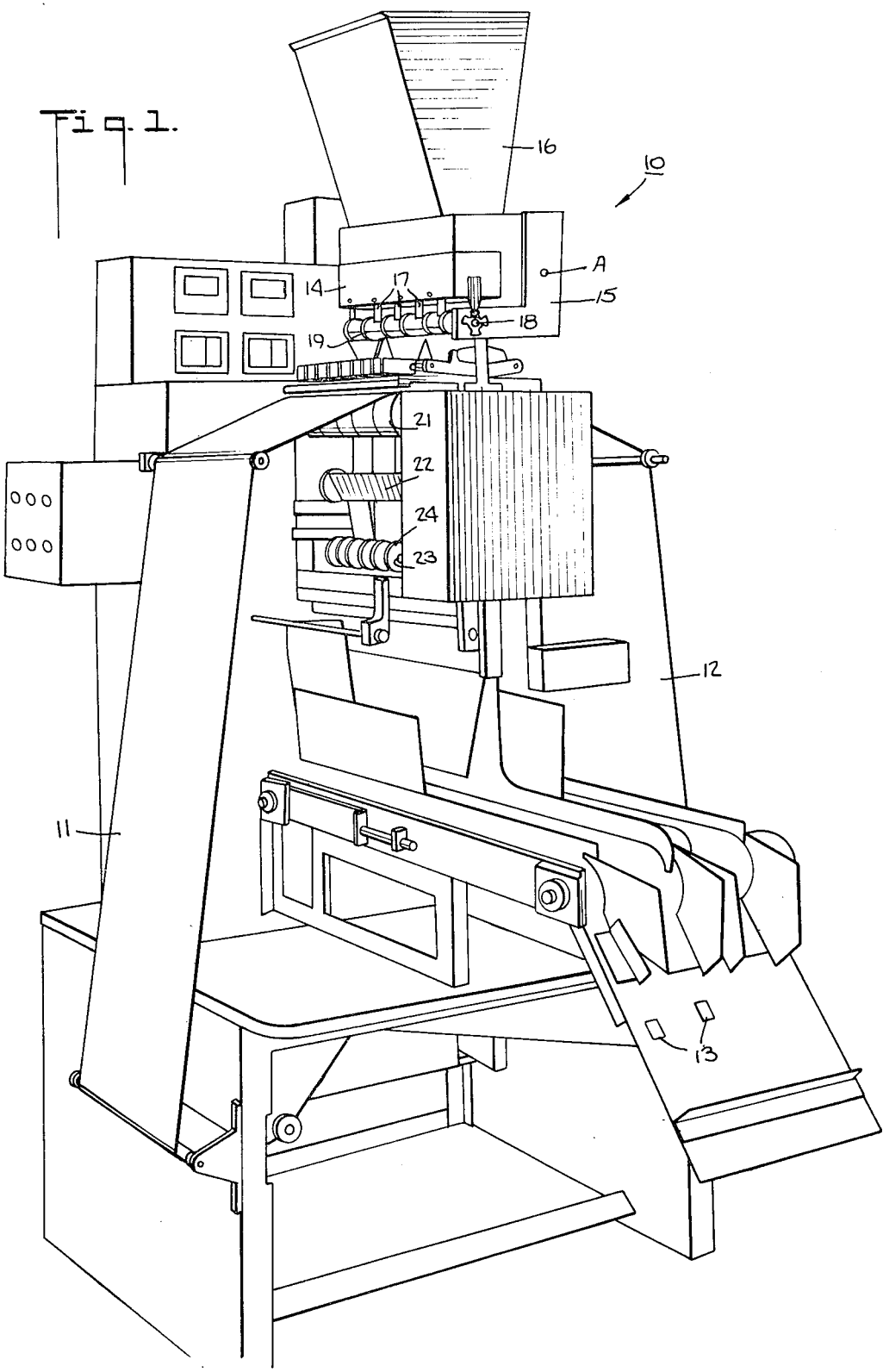
FIG. 1 illustrates a perspective view of a packaging machine according to the invention.

Referring to FIG. 1, the packaging machine 10 is of generally conventional construction. To this end, the machine 10 is provided with various controls and transmissions to effect the feeding of a supply of flowable material to the machine, the feeding and supply of a pair of sheets 11, 12 of packaging material and various synchronizing means to effect sealing and cutting of the sheets 11, 12 to produce individual packets 13 of packaged material. Such controls are well known and are not believed to require further description.

The packaging machine includes a hopper 14 for receiving a supply of flowable material from a suitable source (not shown). The hopper 14 is carried on a frame 15 of the machine and cooperates with a chute 16 which directs the delievered material into the hopper 14. A plurality of outlet nozzles 17 are mounted in the base of the hopper 14 for the outflow of a plurality of streams of the flowable material.

In addition, a rotatable dumper shaft 18 is mounted in the frame 15 below the hopper 14 and has a plurality of longitudinally spaced apart flow measuring means 19 to receive the streams of flowable material. A plurality of guide tubes 20 (FIG. 2) are aligned with a respective measuring means 19 to receive and guide a measured amount of material downwardly. These guide tubes 20 are disposed between a suitable means 21 for sealing the continuous sheets 11, 12 to each other between and alongside the guide tubes 20. In addition, a pair of rotatable seal bars 22 are provided to effect a transverse seal across the sheets 11, 12 to define sequentially spaced packets containing measured amounts of material.

A suitable drive means such as discs 23 on rotatable shafts 24 are provided for moving the sheets 11, 12 over the guide tubes 20 and to effect movement of the sheets 11, 12 through the machine 10.

Figures 2, 3:
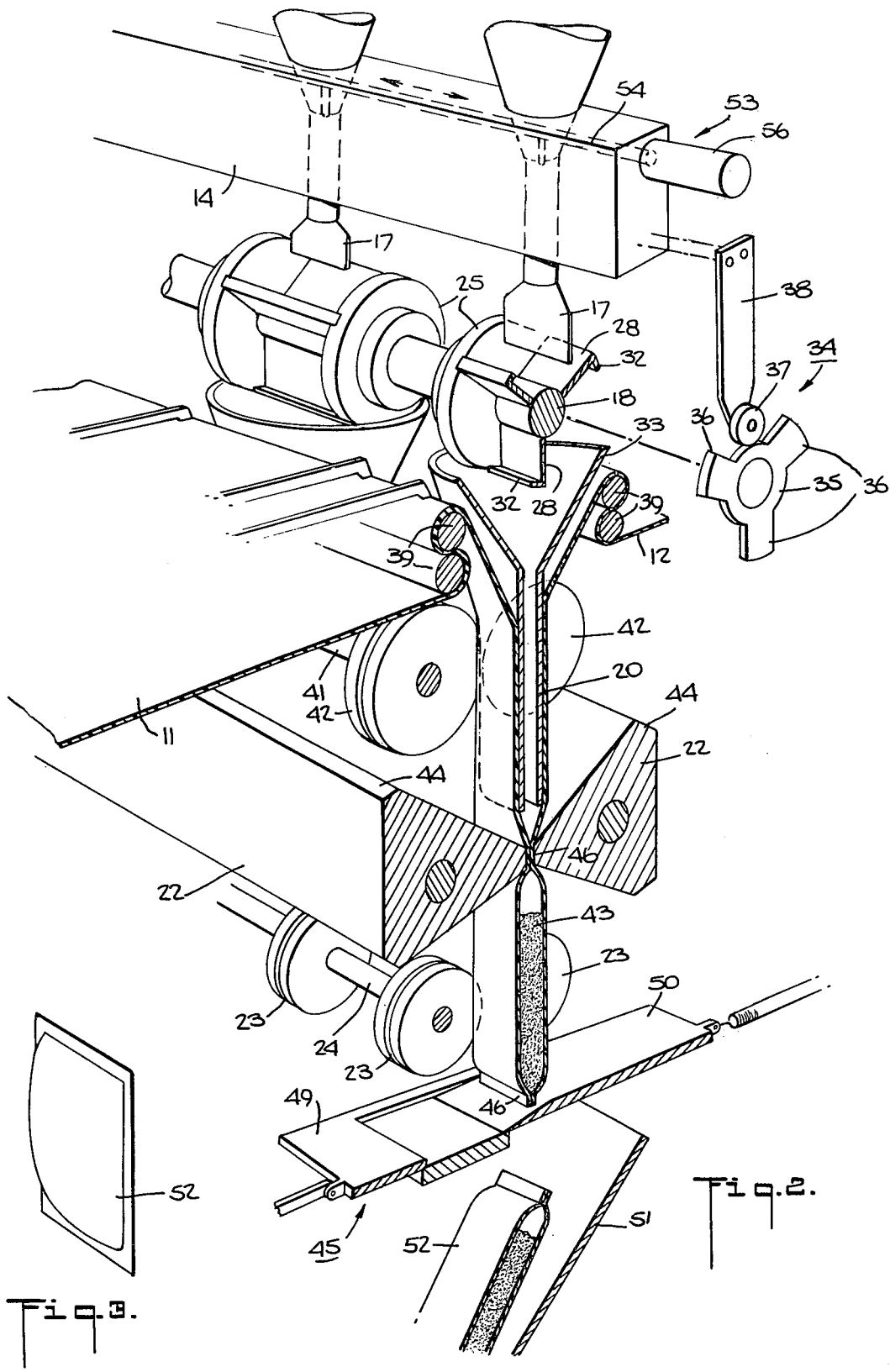
FIG. 2 illustrates a perspective fragmentary view of the packaging machine of FIG. 1.
FIG. 3 illustrates a packet produced on the packaging machine of FIG. 1.

Referring to FIGS. 2 and 7, each flow measuring means 19 of the dumper shaft 18 is disposed below a respective outlet nozzle 17 of the hopper 14 and includes a pair of discs 25 adjustably mounted on the shaft 18 in coaxial relation for longitudinal movement along the shaft 18. The discs 25 are secured in place by means of a pair of locking collars 26. As shown, each locking collar 26 is secured to the shaft by means of a suitable set screw 27. In addition, each measuring means 19 includes a plurality of plates 28 between the discs 25 and radially of the dumper shaft 18 to define a plurality of circumferentially spaced material receiving chambers 29 (FIG. 8). Each of the discs 25 is provided with a radial slot 30 to receive one edge of each plate 28. In this way, the plates 28 are disposed in fixed relationship with the discs 25. As shown, there are three plates 28 to define three material receiving chambers 29 with the discs 25. In addition, a slot 31 is provided in the dumper shaft 18 to accommodate a lower edge of one of the plates 28. For this purpose the plate 28 which is so located is made slightly longer than the other two plates. In addition, each of the plates 28 is provided with a lip 32 at the outer radial edge for purposes as described below.

In order to change the size of a chamber 29, the locking collars 26 are loosened and moved along the shaft 18. Thereafter, the discs 25 are moved along the shaft 18 and the plates 28 removed and replaced by plates (not shown) of greater or smaller width. The discs 25 are then placed in engagement with the new plates and the locking collars 26 abutted against the discs 25 and secured in place on the shaft 18. In this way the width of each chamber 29 can be readily and quickly changed.

It is to be noted that instead of using a separate locking collar 26 and disc 25, both elements may be integrated into a single piece.

Referring to FIGS. 2 and 4, each of the guide tubes 20 is made with a funnel-shaped portion 33 at the upper end which is located in alignment with a flow measuring means 19 of the dumper shaft 18. The remainder of each tube 20 is of generally flattened elliptical shape as indicated in FIG. 5. In addition, the funnel-shaped upper portion 33 partially envelopes each of the flow measuring means 19 of the dumper shaft 18 to directly receive a measured amount of material therefrom.

Referring to FIGS. 1 and 2, the hopper 14 is pivotally mounted in the frame 15 about an axis A and a suitable means 34 is provided to move the hopper 14 vertically relative to the dumper shaft 18. This means 34 is of a Geneva Wheel construction. For example, as shown in FIG. 2, a cam 35 is secured to each end of the dumper shaft 18 which cam has a plurality of lobes 36 corresponding to the number of chambers 29 in each of the flow measuring means 19, for example three, as shown. In addition, the hopper 14 carries a cam follower 37 at each end which is mounted on a depending bracket 38. The cam follower 37 is positioned to project between the lobes 36 of the cam 35 on the dumper shaft. Thus, upon rotation of the dumper shaft 18 and the cams 35, the cam follower 37 and brackets 38 are raised and lowered in accordance with the movement of the dumper shaft 18. In this way the hopper 14 is moved up and down.

As shown in FIG. 2, when the hopper 14 is moved vertically, the outlet nozzles 17 follow. Initially, when the hopper 14 is in a lowermost position, each of the outlet nozzles 17 projects into the plane of a material receiving chamber 29 of the dumper shaft 18. The amount of penetration into each chamber 29 may be adjusted by adjusting the brackets 38 on which the cam followers 37 are mounted.

Referring to FIG. 4, the packaging machine 10 includes a number of suitable guide rollers 39 for guiding the two sheets 11, 12 through the machine 10 and into opposed relation to each other. In addition, one or more electrostatic bars 40, as is known, may be provided in the packaging machine.

In order to form individual packets, a sealing means 21 for sealing the continuous sheets to each other between and alongside the guide tubes is in the form of a pair of rotatable shafts 41 each of which carries a plurality of sealing discs 42. These sealing discs 42 operate as side sealers to effect longitudinal sealing seams between the two sheets 11, 12 in the area between the guide tubes 20. In addition, the pair of rotatable seal bars 22 are disposed below the guide tubes 20 for sealing the sheets 11, 12 to each other transversely of the guide tubes 20 to form transverse sealing seams. The seal bars 22 thus form sequentially spaced packets containing the measured amounts of material 43. As shown in FIG. 4, the seal bars 22 are of generally triangular shape with flat sealing surfaces 44 at the respective apexes. The seal bars 22 effect not only a bottom seal for a packet to be filled but also a top seal for a packet which has been filled.

A suitable means 45 is disposed below the drive means 23, 24 to effect cutting of the interconnected packets through the transverse seal lines 46. In addition, suitable knives (not shown) are positioned within the machine 10 to effect vertical cuts in the vertical seal lines 47 (FIG. 5) between the packets. In this way individual packets are dispensed from the packaging machine 10.

As shown in FIG. 4, the cutting means 45 includes a knife cam 48 which is synchronized to rotate and move a knife blade 49 reciprocally into the plane of the packets which are interconnected against a spring loaded shear plate 50 which is disposed opposite the knife blade 49 to effect the cutting operation. In addition, a chute 51 is disposed below the cutting means 45 to direct the severed packets 52 onto a suitable conveyor (FIG. 1).

The operation of the machine is carried out in a synchronized fashion by a suitable transmission means (not shown). To this end the machine is synchronized so that the sheet drive means 23, 24 are continuously operated to pull the sheets through the packaging machine 10. In addition, the seal bars 22 are continuously rotated and are of a size to effect transverse seals at predetermined points spaced from each other. Similarly, the side seal discs 42 are continuously operated to form continuous seal lines 47. The dumper shaft 18 is interconnected with the main transmission through a suitable cam (not shown) so as to be rotated at periodic intervals and held at rest inbetween such intervals. During the rest periods, filling of the chambers 29 of the dumper shaft 18 is accomplished. The motion of the cutting means 45 is similarly synchronized off the transmission of the machine.

Referring to FIG. 2, in operation, the dumper shaft 18 is initially located at the chambers 29 below a respective nozzle 17. At this time, material flows from the hopper 14 through the nozzles 17 into the respective chambers 29. Since the nozzles 17 penetrate into each chamber 29, the material ceases to flow upon reaching the level of the lower end of each nozzle 17. At this time a predetermined volume of material is contained in each chamber 29.

The filling time required to fill the chamber is predetermined so that the timing for rotating the dumper shaft 18 can be accurately set within the machine transmission. That is, the cam (not shown) for rotating the dumper shaft 18 can be suitably interconnected to the transmission.

After filling of the chamber 29, the dumper shaft 18 is caused to rotate 120°. During this rotation, the hopper 14 is first lifted upwardly via the cams 36 and cam followers 37 to clear the trailing plate 28 of the chamber 29 and then allowed to move down into the next chamber 29. As the dumper shaft 18 rotates, the measured amount of material in the filled chamber 29 dumps into the funnel-shaped end 33 of a guide tube 20 and flows downwardly. This material then flows out of the lower end of the guide tube 20 and is contained between the two sheets 11, 12 by virtue of the transverse seal line 46.

At about the time that the material is to be dispensed from the dumper shaft 18, the two seal bars 22 have rotated so that the sealing faces 44 are disposed opposite each other to effect the transverse sealing of the two sheets 11, 12 together. Thus, when the material is dispensed from the guide tube 20, the material will be retained within the space of the packet defined by the transverse and vertical seals. Continued operation of the machine results in the seal bars 22 rotating 120° to bring the next two sealing faces 44 into juxtaposition to again seal the two sheets 11, 12 together transversely. This effects a sealing off of individual packets of material 43 of accurately measured amounts.

After rotation of the dumper shaft for 120°, the shaft 18 is held at rest and filling of a successive chamber 29 is carried out and the above sequence is again performed by the machine 10.

After the packets have been sealed along the sides, the bottom and the top, the interconnected series of packets are passed through the cutting means 45 and a cutting operation is carried out to cut through the common edges of two successive packets. In this way, individual packets 52 are sequentially severed from the interconnected stream of packets.

Referring to FIG. 4, when it is required to change the size of the material receiving chamber 29 of the dumper shaft 18, such can be done without removing the shaft 18 from the machine 10. Specifically, the various locking collars 26 holding the discs 25 in place are loosened so that the discs 25 can be moved apart and the separating plates 28 replaced by plates of larger or smaller width. This can be accomplished without tearing down any portion of the machine.

Since the details of the various transmission means synchronizing and timing means are quite evident, further description has not been made.

Referring to FIG. 2, the hopper 14 is provided with a suitable agitating means 53 which serves to agitate the material within the hopper 14 to prevent blocking of the nozzle outlets 17. The agitating means 53 may be in the form of an elongated rod 54 which extends into and across the hopper 14 and a plurality of fingers or tabs 55 which depend from the rod 54. The rod 54, as shown in FIG. 4, is disposed in coincidence with the midpoint of the hopper 14 and is connected to an air cylinder 56 outside the hopper 14. The air cylinder 56 serves to reciprocate the rod 54 back and forth at suitable times and may be activated, for example, when the dumper shaft 18 is in a rest position. This will cause agitation of the material within the hopper 14 during a filling operation so as to avoid clumping of the material in the hopper 14.

The packaging machine 10 is useful in dispensing various types of materials into packets. For example, the machine 10 is useful in packaging granular products which are common in the food industry. In addition, materials such as dry noodles and the like may also be dispensed. In such a case, suitable guides may also be positioned about the respective measuring means 19 on the dumper shaft 18. Such a guide 57 may include a portion to retain materials, such as noodles, within a chamber 29 of the dumper shaft 18 until the chamber 29 is positioned in the plane of the funnel portion of a guide tube 20. The guide may also be provided with a hole or slot 58 near a lowermost position in order to guide the noodles into the guide tube 20. In addition, a suitable opening may be formed in the uppermost portion of such a guide to permit an agitator to project downwardly into the chamber to agitate the noodles during a filling operation in order to prevent a bridging effect from occurring in the noodles.

Figure 9:
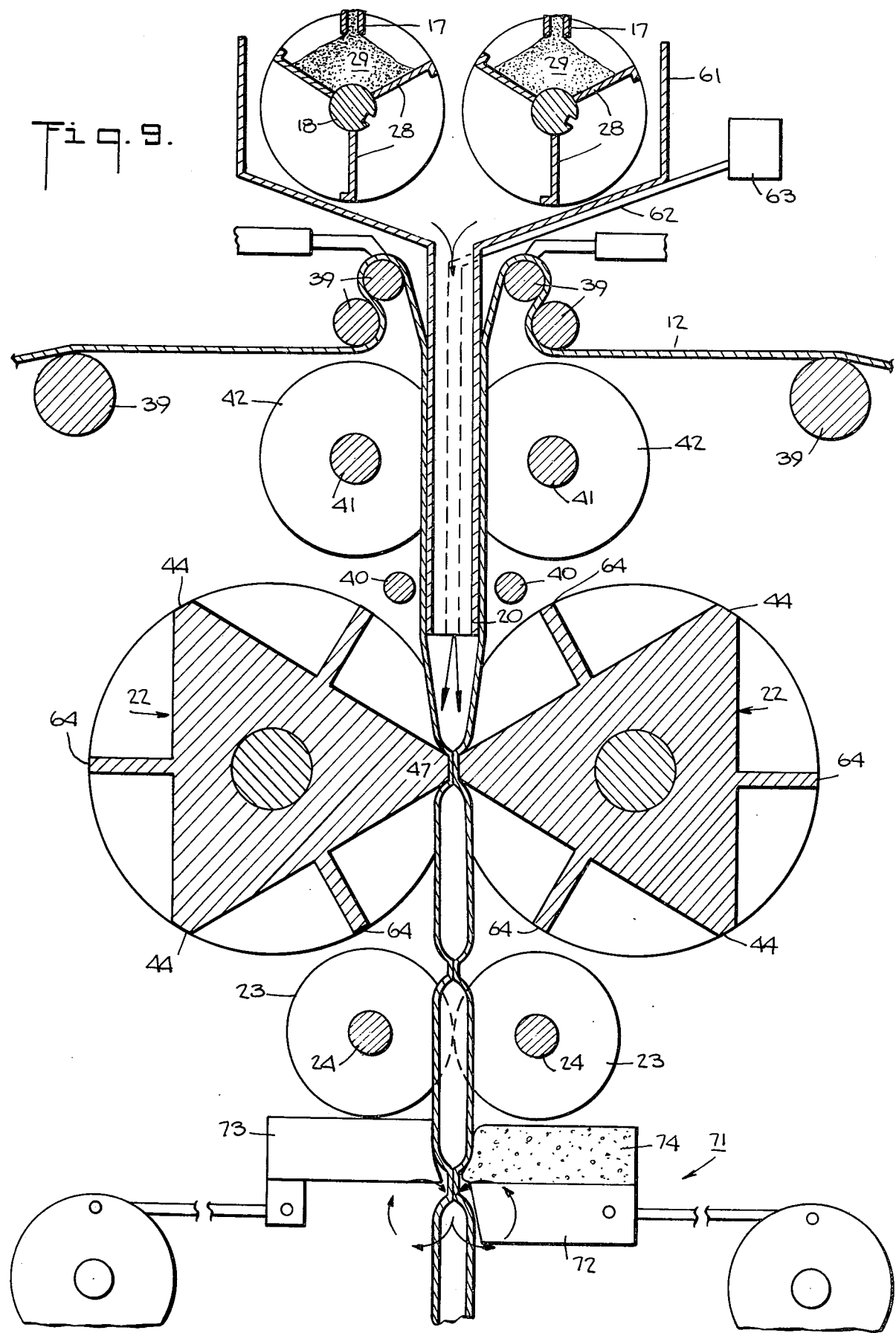
FIG. 9 illustrates a modified packaging machine according to the invention utilizing a dual system of dumper shafts, and an orbital cutting means.

Referring to FIG. 9, wherein like reference characters indicate like parts as above, the packaging machine is provided with a dual feeding system whereby different materials may be dispensed into the packets to be formed. To this end, the dual system includes a pair of hoppers (not shown) each of which has a plurality of outlet nozzles 17 and a pair of dumper shafts 18 below the nozzle 17 of the hoppers. The two dumper shafts 18 are located within an enlarged funnel portion 61 of the guide tubes 20 so as to dispense the various materials into the guide tubes 20.

The operation of the respective dumper shafts 18 is similar to the above and no further description is believed to be necessary.

Figure 11:
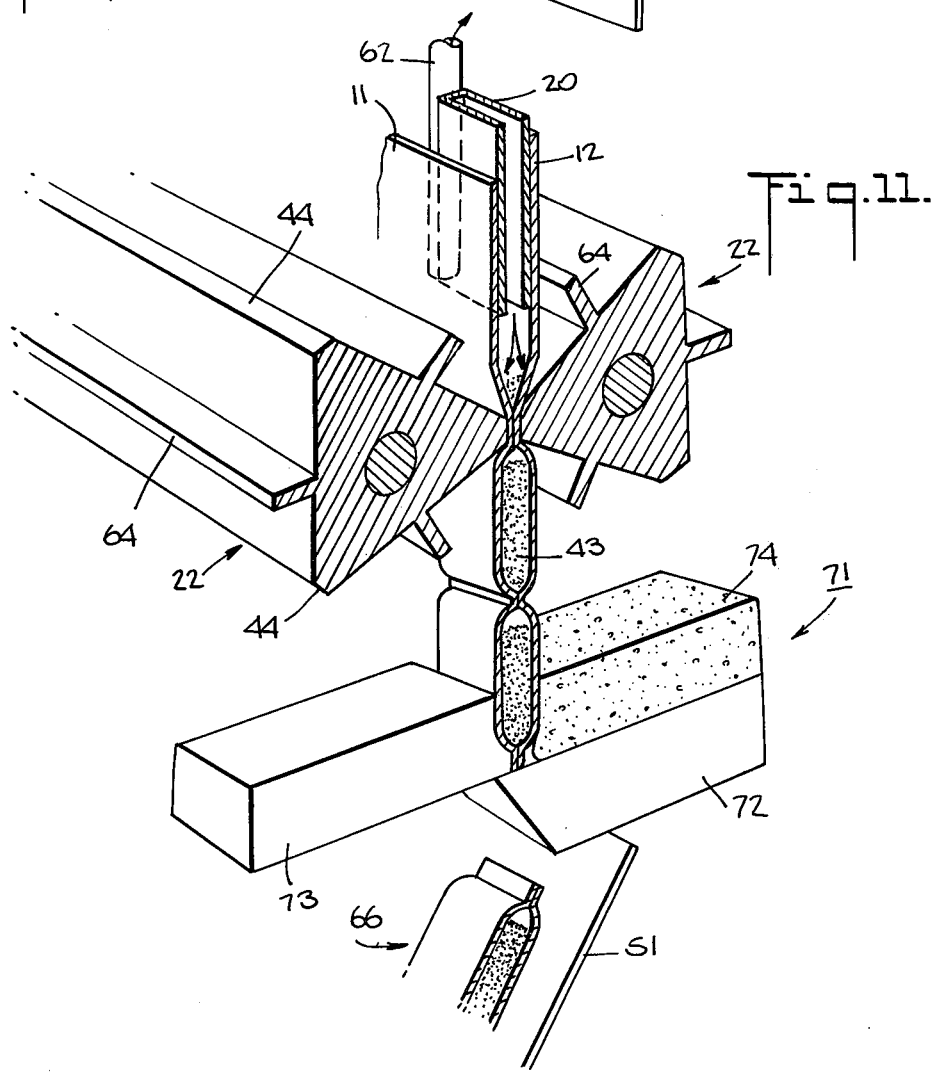
FIG. 11 illustrates a means of evacuating dust from the packets to be made and a modified sealing means according to the invention.

Referring to FIG. 11, in order to prevent the accumulation of dust in the region where the material is dumped into the area where the paper sheets are joined, a suitable evacuating means is provided. To this end, the evacuating means includes a pair of conduits 62 which are located alongside each respective guide tube 20 and extend to the lower end of each guide tube 20. In addition, a suitable suction means 63 is connected to the conduits 20 (FIG. 9) in order to evacuate the region surrounding the lower end of each guide tube 20. The respective conduits 62 may be connected in common or in any other suitable fashion to the suction means 63 so that a suitable suction can be maintained therein. During operation, the suction force developed within the conduits 62 pulls any dust or the like from the region immediately below the guide tubes 20 and above the dispensed material for 43. In this way, any dust that may otherwise interfere with the sealing of the two sheets 11, 12 together may be avoided. Thus, a reliable seal is effected.

Alternatively, the conduits 62 may be connected to a means for supplying a flowable material for packaging within the packets. For example, any suitable liquid or dry material may be injected for packaging purposes. In order to prevent spoilage, nitrogen may be injected or steam or any other suitable sterilization liquid may be injected.

Referring to FIGS. 9, 11 and 16, a double-pocket packet may be obtained. To this end, each of the seal bars 22 is provided with three flat sealing surfaces 44 at the respective apexes along with three additional seaming surfaces 64. These latter seaming surfaces are disposed in alternation with the sealing surfaces 44 and are of narrower width. For example, where the sealing surfaces 44 are ⅛ inch, the seaming surfaces 64 are ⅛ inch in width. As shown, the seaming surfaces 64 are formed as projections on the sealing bars 22. Alternatively, the sealing bars 22 may be formed of hexagonal shape. The operation of the sealing bars 22 is similar to that as described above. However, in order to fill each pocket 65 of the double pouched packet 66 (FIG. 16) the operation of the seal bars 22, the hoppers and dumper shafts 18 are synchronized so that the product is dispensed through the guide tubes after a seal has been effected by each of the sealing surfaces 44 and seaming surfaces 64.

As shown in FIG. 16, the double pocket packet 66 is formed with two pockets 65 each of which contains an equal amount of material. As shown, the packet includes a pair of sheets which are sealed together via a pair of longitudinal sealing seams 67, a pair of transverse sealing seams 68 and an intermediate sealing seam 69. The longitudinal and transverse sealing seams secures overlapped edges of the sheets together about the periphery of the packet 66 while the intermediate sealing seam secures intermediate portions of the sheets together. This intermediate sealing seam 69 is of narrower width than the two transverse sealing seams 68 since the intermediate sealing seams 69 are formed by the seaming surfaces 64 of the seal bars 22. The packet 66 provides a unique construction since the material in each pocket 65 substantially fills the entire pocket. As a result, there is limited free space within each pocket. In use, such packets 66 may be used to package half gram quantities of a given material such as a sweetener. Thus, a consumer who wishes to use only half or a full gram measurement may tear off only one pocket 65 from the packet for use at a given time. This can avoid the inconvenience of tearing open a full gram packet and dispensing only half of the product therein while retaining the remainder of the product in an open packet for future consumption.

Figure 10:
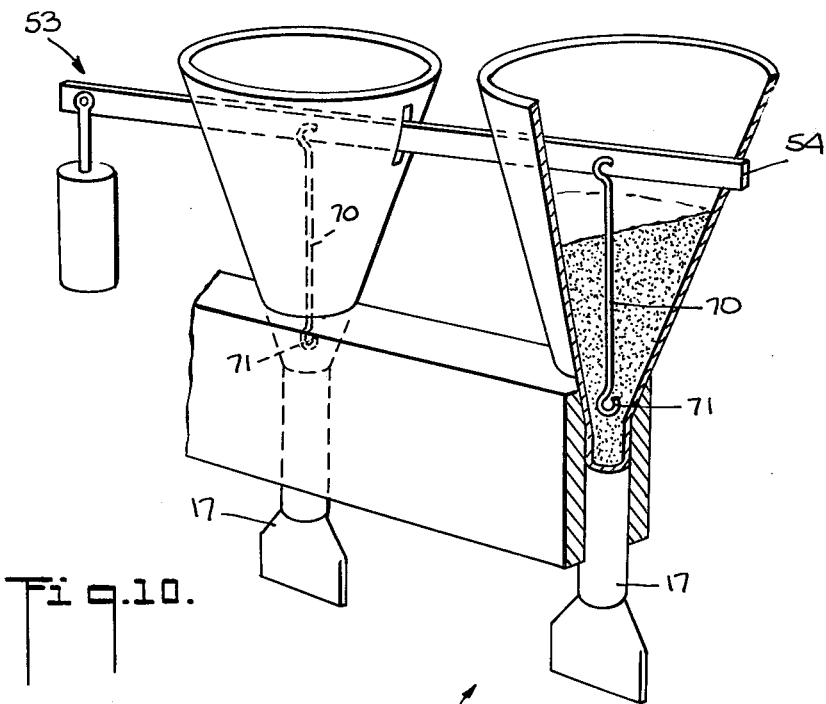
FIG. 10 illustrates a perspective view of an agitator means according to the invention.

Referring to FIG. 10, the agitator means 53 may utilize dependent fingers 70 each of which extends from the rod 54 into the respective outlet nozzles 17. As shown, each of the series of vertically reciprocal fingers 70 has a curled lower end 71 which is disposed within the nozzles 17. During reciprocation, these curled lower ends serve to break up the product to avoid accumulations which might otherwise block the free flow of material through the nozzles 17.

Referring to FIG. 9, the packaging machine is provided with a rotary or orbital cutting means 71 downstream of the seal bars 22. The purpose of this orbital cutting means is to avoid puckering of the sheets 11, 12 during severing so as to permit a clean cut. At the same time, the cutting means allows the sheets 11, 12 to be slightly stretched in the region of the sealing surfaces 44, 64 of the seal bars 22 so as to enhance the sealing effect of the seal bars 22. For this purpose, the cutting means 71 includes an orbitally movable cutting blade 72 and an orbitally movable shear plate 73. The blade 72 and plate 73 are mounted on suitable means or mechanisms so as to permit movement of the respective members in an orbit around a fixed axis. In addition, a means is provided for reciprocating the blade 72 relative to the plate 73 in order to sever the sheets 11, 12. This means may be in the form of a cam actuated shaft (not shown) which is mounted on the mechanism for orbiting the blade 72. In addition, a resilient block 74, for example of a synthetic foam material, is mounted on top of the blade 72 in opposition to the plate 73. As indicated in FIG. 12, the block 74 is mouted to project past the severing edge of the cutting blade 72 in the direction of the plate 73. This permits abutment of the block 74 against the blade 73 prior to severing of the sheets 11, 12.

Referring to FIGS. 12 to 15, in operation, the blade 72 and plate 73 are rotated to move from spaced apart positions towards each other (FIG. 12). After some increment of rotary motion, the block 74 and plate 73 abut against the moving sheets 11, 12 of material and engage the sheets 11, 12 under some gripping force (FIG. 13). Upon continued rotation, the blade 72 and plate 73 pull the gripped sheets 11, 12 downwardly (FIG. 14). For this purpose, the speed of the orbital blade 72 and plate 73 is slightly greater than the speed of the seal bars 22. To this end, the cutting means is driven off the same source as the remaining components of the machine but, for example, has a drive mechanism which has one more tooth than a cutting means 49, 50 as described above in FIG. 4. The difference in speed causes the sheets 11, 12 to stretch from the point of engagement upwardly through the machine. Thereafter, the blade 72 is moved towards the plate 73 to effect severing of a packet 66 from the sheets 11, 12 (FIG. 15). Continued rotary motion brings the blade 72 and plate 73 away from each other allowing the sheets 11, 12 to return to the unstretched condition.

It is to be noted that during severing of the packets 66, the stretch within the sheets 11, 12 allows the sheets to be somewhat flattened between the seal bars 22 so as to permit a more reliable seal to be formed by the sealing surfaces 44, 64.

In each of the above described embodiments, the outlet tube 17 may be adjustably mounted within the respective hoppers so as to permit adjustment to dispense different weights within different streams or to permit dispensing of different materials, such as dyes, in different streams. Similarly, the respective hoppers may be adjustably mounted relative to the dumper shafts 18 so as to permit dispensing of greater or less material.

The invention thus provides a machine which can be used to dispense a wide range of packet sizes with a wide range of content weight.

The invention further provides a machine which can be readily adapted to different sizes of packets and which can be readily adjusted to dispense a wide range of measured amounts of material.

In the case where the sheets of material for forming the packets are preprinted, suitable means are provided to register the movement of sheets with the various movable parts of the machine. For example, a photoelectric means can be used to monitor the movement of the sheets through the machine via the use of code marks on the sheets correlated to a particular operation of the machine as is known.

Also, while the entire width of the machine may be used for forming packets, a partial width may also be used as is known. Further, the various sealing means and seal bars may be heated in any conventional manner to effect a seal in the sheets.

What is claimed is:

1. A packaging machine comprising
   a hopper for receiving a supply of flowable material, said hopper having a plurality of outlet nozzles in a base thereof for outflow of a plurality of streams of the flowable material;
   a rotatable dumper shaft below said hopper, said dumper shaft having a plurality of flow measuring means thereon, each said measuring means being disposed below a respective hopper outlet nozzle and including a plurality of material receiving chambers circumferentially disposed about said shaft, each said chamber being of adjustable size to receive varying amounts of material from a respective outlet nozzle;
   a plurality of guide tubes, each said tube being aligned with a respective measuring means to guide a measured amount of material therethrough;
   a pair of conduits adjacent each respective guide tube, each said conduit extending to the lower end of a respective guide tube;
   suction means connected to said conduit to evacuate the region surrounding the lower end of a respective guide tube;
   means for moving a pair of continuous sheets over said guide tubes;
   means for sealing the continuous sheets to each other between and alongside said guide tubes; and
   a pair of rotatable seal bars below said guide tubes for sealing the sheets to each other transversely of said guide tubes to define sequentially spaced packets containing measured amounts of the material.

2. A packaging machine as set forth in claim 1 wherein said outlet nozzles are adjustably mounted in said hopper relative to said dumper shaft to dispense different amounts of material.

3. A packaging machine as set forth in claim 1 wherein said hopper is vertically adjustably mounted above said dumper shaft.

4. A packaging machine comprising
   a pair of hoppers for receiving a supply of flowable material, each said hopper having a plurality of outlet nozzles in a base thereof for outflow of a plurality of streams of the flowable material;
   a pair of rotatable dumper shafts, each said shaft being disposed below a respective hopper, each said dumper shaft having a plurality of flow measuring means thereon, each said measuring means being disposed below a respective hopper outlet nozzle and including a plurality of material receiving chambers circumferentially disposed about said shaft, each said chamber being of adjustable size to receive varying amounts of material from a respective outlet nozzle;
   a plurality of guide tubes, each said tube being aligned with a respective measuring means to guide a measured amount of material therethrough;
   means for moving a pair of continuous sheets over said guide tubes;
   means for sealing the continuous sheets to each other between and alongside said guide tubes; and
   a pair of rotatable seal bars below said guide tubes for sealing the sheets to each other transversely of said guide tubes to define sequentially spaced packets containing measured amounts of the material.

5. A packaging machine as set forth in claim 4 further comprising means for moving said hoppers in unison relative to said dumper shafts to dispense a different product into each respective dumper shaft.

6. A packaging machine comprising
   at least one guide tube for receiving a measured amount of material;
   means for moving a pair of continuous sheets over said guide tube;
   means for sealing the continuous sheets to each other alongside said guide tube;
   sealing means for sealing the sheets to each other transversely of said guide tube to define sequentially spaced packets of material;
   a pair of conduits adjacent said guide tube and extending to the lower end of said guide tube; and
   suction means connected to said conduits to evacuate the region surrounding the lower end of said guide tube.

7. A cutting means for a travelling pair of sheets comprising an orbitally movable cutting blade, an orbitally movable shear plate opposite said cutting blade, a resilient block mounted on said blade opposite said plate to abut said plate for engaging the sheets therebetween, said block projecting from said blade in the direction of said plate, said blade and said plate being disposed to sequentially engage and pull the travelling pair of sheets therebetween, and means for reciprocating said blade relative to said plate to sever the engaged sheets.

8. A packaging machine comprising
   a hopper for receiving a supply of flowable material, said hopper having a plurality of outlet nozzles in a base thereof for outflow of a plurality of streams of the flowable material;
   a rotatable dumper shaft below said hopper, said dumper shaft having a plurality of flow measuring means thereon, each said measuring means being disposed below a respective hopper outlet nozzle and including a plurality of material receiving chambers circumferentially disposed about said shaft, each said chamber being of adjustable size to receive varying amounts of material from a respective outlet nozzle;
   an agitator means including a series of vertically reciprocal depending fingers, each said finger being disposed within a respective outlet nozzle;
   a plurality of guide tubes, each said tube being aligned with a respective measuring means to guide a measured amount of material therethrough;
   means for moving a pair of continuous sheets over said guide tubes;
   means for sealing the continuous sheets to each other between and alongside said guide tubes;
   a pair of rotatable seal bars below said guide tubes for sealing the sheets to each other transversely of said guide tubes to define sequentially spaced packets containing measured amounts of the material.

9. A packaging machine comprising
   a hopper for receiving a supply of flowable material, said hopper having a plurality of outlet nozzles in a base thereof for outflow of a plurality of streams of the flowable material;

a rotatable dumper shaft below said hopper, said dumper shaft having a plurality of flow measuring means thereon, each said measuring means being disposed below a respective hopper outlet nozzle and including a plurality of material receiving chambers circumferentially disposed about said shaft, each said chamber being of adjustable size to receive varying amounts of material from a respective outlet nozzle;

a plurality of guide tubes, each said tube being aligned with a respective measuring means to guide a measured amount of material therethrough;

means for moving a pair of continuous sheets over said guide tubes;

means for sealing the continuous sheets to each other between and alongside said guide tubes;

a pair of rotatable seal bars below said guide tubes for sealing the sheets to each other transversely of said guide tubes to define sequentially spaced packets containing measured amounts of the material; and a cutting means downstream of said seal bars for severing sequentially formed packets from said sheets, said cutting means including an orbitally movable cutting blade and an orbitally movable shear plate for engaging and severing said sheets therebetween while pulling said sheets to slightly stretch said sheets.

* * * * *